(12) United States Patent
Brennan

(10) Patent No.: US 7,707,697 B2
(45) Date of Patent: May 4, 2010

(54) ATTACHMENT DEVICE

(76) Inventor: Steven Brennan, 16220 Meridian Ave., N., Shoreline, WA (US) 98133

( * ) Notice: Subject to any disclaimer, the term of this patent is extended or adjusted under 35 U.S.C. 154(b) by 570 days.

(21) Appl. No.: 11/468,947

(22) Filed: Aug. 31, 2006

(65) Prior Publication Data
US 2007/0071577 A1    Mar. 29, 2007

Related U.S. Application Data

(60) Provisional application No. 60/713,317, filed on Sep. 1, 2005.

(51) Int. Cl.
*F16G 11/00* (2006.01)
(52) U.S. Cl. .................. 24/135 R; 24/115 R; 403/391
(58) Field of Classification Search ............. 24/115 R, 24/135 R, 136 L, 136 R, 115 M, 136 B, 122.6, 24/115 K, 115 H, 114.5; 403/391, 396, 209, 403/211, 213; 29/469, 525.11
See application file for complete search history.

(56) References Cited

U.S. PATENT DOCUMENTS

| 1,388,664 A | * | 8/1921 | Officer | .................. 403/213 |
| 2,017,887 A | * | 10/1935 | Blackburn | .................. 403/27 |
| 5,322,132 A | * | 6/1994 | Franks, Jr. | .................. 174/41 |
| 6,260,241 B1 | * | 7/2001 | Brennan | .................. 24/135 R |

* cited by examiner

*Primary Examiner*—James R Brittain
(74) *Attorney, Agent, or Firm*—Marcia A. Devon

(57) ABSTRACT

Disclosed is an improved splicing nut of the type having a threaded nut portion and a core that is capable of being threaded into the nut portion, the nut portion and the core cooperating to receive and firmly retain a line therein. In the first embodiment of the invention, a visualization port is included in the core for providing visual access to at least a portion of the area between the nut portion and the core so that a user may quickly ascertain by looking through the visualization port whether or not a line is fully engaged with the splicing nut. Additional provision is made to cause the line to be compressed when the core is threaded into the nut portion and tightened. As a result, line slippage within the splicing nut is prevented. The invention further includes a fastening portion of the core that is exposed when the nut portion is firmly tightened onto the core. Either a pin hole or a shackle fastening means is included in the fastening portion for allowing additional hardware to be installed thereon with requiring the line to be removed from the splicing nut.

15 Claims, 3 Drawing Sheets

ATTACHMENT DEVICE

This application claims the benefit pursuant to 35 U.S.C. 119(e) of U.S. Provisional Patent Application Ser. No. 60/713,317 filed by the applicant on Sep. 1, 2005.

FIELD OF THE INVENTION

This invention relates generally to hardware that can be used to secure a variety of braided ropes and lines to other objects.

DISCUSSION OF RELATED ART

There is a need for a device which enables the user to form loops with which to attach various other objects, such as additional lines, eyelets, shackles, cleats and the like. A splicing nut fulfills the need and includes a threaded hole and a core, the core having threads on its exterior for threading into the nut, the core also having slots into which a line can be placed.

It is also desirable to provide an alternate type of attachment point for such other hardware, instead of a loop of rope. For example, a clevis pin that attaches a clevis bracket to various other objects is best attached to a more durable attachment point than a loop in a line, as the clevis pin may, over time; damage such a line by ordinary wear. Likewise, there are situations where it is desirable to quickly fasten an object such as an anchor chain, for example, without necessarily having to remove the nut and core from the line to which the anchor chain is to be attached. Therefore, there is a need for a splicing nut device that allows for flexibility and added convenience in fastening to other objects such as eyelets, hooks, shackles, chains, cleats, or the like for a multitude of applications. Some of the many applications of the splicing nut device include marine hardware, all types of tents and other canvass products, and military hardware.

Moreover, proper use of such splicing nuts can be vital to safety or protecting property. Prior designs include no provision for determining whether the core is fully engaged with the nut. As a result, an improperly fastened line therein may go undetected, which can jeopardize the integrity of the hold between the splicing nut and the line. It is therefore desirable to have a device whereby a quick inspection of the fit between the line and the splicing nut may be made without removing the nut from the core.

It is an objective of the present invention to facilitate the attachment of various other hardware elements engaged with the splicing nut device with or without a line. The present invention is designed to serve as a platform to be integrated with many types of devices. It is desirable to provide multiple methods of attaching the splicing nut to other equipment. It is a further objective of the present invention for the user to be able see at a glance if the line is engaged with the splicing nut correctly. The present invention accomplishes all of these objectives.

SUMMARY OF THE INVENTION

The present device is a splicing nut having a threaded nut portion and a core that is capable of being threaded into the nut portion. The core is generally defined by a solid cylindrical body having a top end, a bottom end opposite of the top end, and an outer surface connecting the top end to the bottom end. The outer surface of the core is formed into prongs which radiate from the center body of the core and projecting from the top end of the core to the bottom end of the core. Slots are formed by and between the prongs. Male threads are formed on the outside surface of the prongs. Threads are disposed on the outer surface and are capable of mating with the threads on the inside surface of the nut portion. A plurality of slots are disposed at the outer surface of the core, each of which extends inwardly from the outer surface of the core towards the center of the core and are shaped so as to be capable of receiving a line therein.

In the first embodiment of the invention, when the threads of the nut portion are fully mated with the threads of the core, at least one of the slots is only partially covered by the nut portion so as to define a visualization port in the core between the core and the nut portion. The visualization port provides visual access to a portion of at least one of the slots. As such, a user may quickly ascertain by looking through the visualization port whether or not a line is fully engaged with the splicing nut.

Preferably, at least one of the slots extends a distance d downward from the top end of the core partway to the center of the core. The distance d is less than the diameter of the line. As such, when the core is threaded into the nut portion, a part of the line engages, and is compressed between, the inside surface of the nut portion and the slot. As a result, line slippage within the splicing nut is prevented or sharply reduced when the core is firmly seated within the nut portion. The line, in such an embodiment, is frictionally held around a bend that the line makes inside of the nut portion, the line being actively squeezed at this point to prevent its movement relative to the core and the nut portion.

A second embodiment of the invention further includes a fastening portion of the core. There are also a number of different fasteners which may be integrated with the splicing nut depending on the particular application. The fastening portion 170 includes the bottom end of the core, and is defined by a portion of the outer surface of the core is not covered by the nut portion when the threads of the nut portion are fully mated with the threads of the core.

An alternate embodiment of the invention includes a pair of shackle fastening means each disposed on the fastening portion on opposing sides of the slots of the fastening portion. Preferably the shackle fastening means includes a shackle strap cavity open at the bottom end of the core and extending partially through the fastening portion towards the top end of the core. A shackle strap locking means for selectively locking one end of a shackle strap therewithin is included. Each end of the shackle strap is adapted to fit into the shackle strap cavity of each shackle fastening means. Thus, in one preferred embodiment one end of the shackle strap may be removed from the fastening portion by disengaging the shackle strap locking means and is adapted to readily add or remove hardware from the shackle. In comparison with prior designs, the preferred embodiment is substantially reduces the difficulty in adding and removing additional hardware to the line.

The visualization port may be included in the fastening portion. A pin hole is formed through the fastening portion between the slots of the fastening portion. Additional hardware, such as a spring-loaded clevis pin, may be installed through the pin hole and is retained thereby, resulting in the line being firmly attached to the additional hardware.

The present invention provides a single device which safely, conveniently, and flexibly secures attachment to a variety of additional hardware. The present invention may be fashioned of similar material to that which is used to manufacture the core, and as such the relative increase in cost of such devices is relatively minor. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
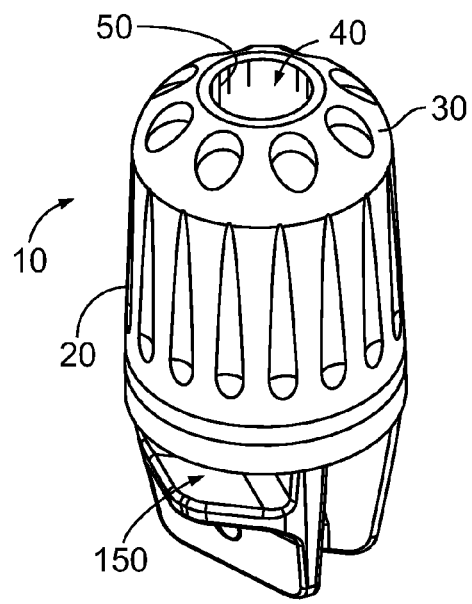
FIG. 1 is a perspective view of a first embodiment of a splicing nut of the present invention.
Figure 7:
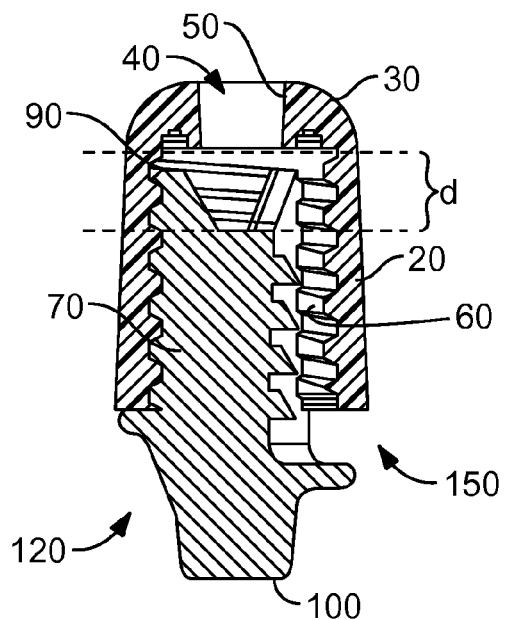
FIG. 7 is a cross-sectional view of the first embodiment, taken generally along lines 7 of FIG. 3.

FIG. 1 illustrates a first embodiment of the splicing nut 10 of the present invention. A nut portion 20 terminates at end 30. A hole 40 extends inward from the end 30 and defines an inside surface 50. The nut portion 20 further includes threads 60 disposed on the inside surface 50 of the hole 40 as shown in FIG. 7.

Figure 5:
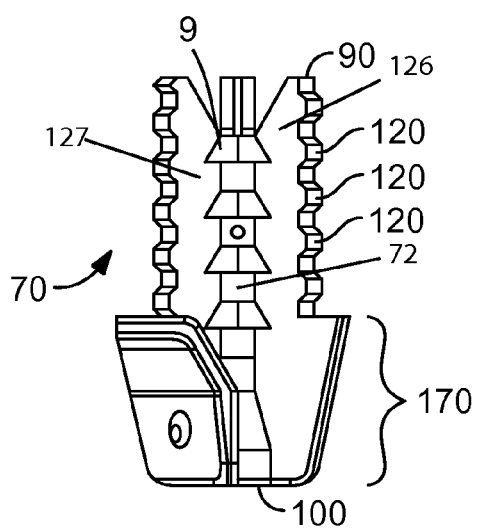
FIG. 5 is a side elevational view of a core of the splicing nut of the first embodiment.
Figure 6:
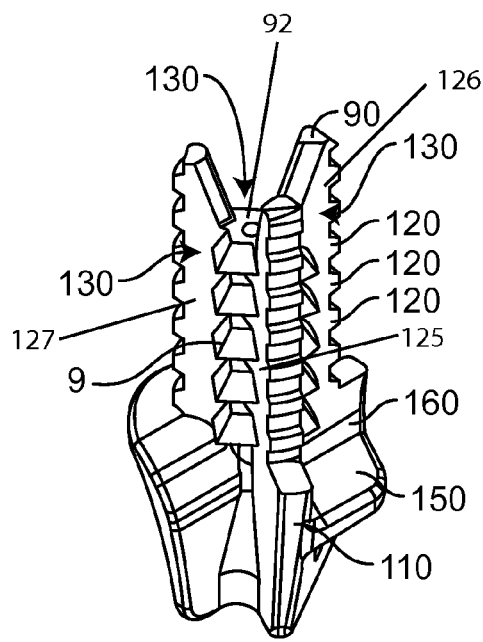
FIG. 6 is a perspective view of the core of the splicing nut of the first embodiment.

A core 70 is configured to be capable of being threaded into the nut portion 20 shown in FIGS. 5-8. Referring to FIGS. 5-6, the core 70 generally is defined by a solid cylindrical body having a top end 90, a bottom end 100, opposite of the top end 90, and an outer surface 110 connecting the top end 90 to the bottom end 100. The outer surface of the core is formed into prongs 125, 126 and 127 which radiate from the center body 72 of the core forming the top end of the prong 92, projecting from the top end of the core 90 to the bottom end of the core. Slots 130 are formed by and between the prongs. Threads 120 are disposed on the outer surface of said prongs 125, 126 and 127 and are capable of mating with the threads 60 on the inside surface 50 of the nut portion 20. A plurality of slots 130 is disposed at the outer surface 110 of the core 70 as seen in FIG. 6. Each of the slots 130 extends inward from the outer surface 110 of the core 70 partway to a center of the core 70. Each of the slots 130 are shaped so as to be capable of receiving a line 140. The line may be, for example, a nylon rope or other flexible line. Ribs 9 may be included to further prevent slippage of the line 140 through the slots 130.

The splicing nut 10 is preferably made from a rigid, strong and durable glass reinforced plastic material with high quality resin that can withstand inclement marine weather. Alternatively, metal may be used if the user is not concerned about corrosion in salt-water environments. Metal-based products may be powder coated or otherwise treated so as to increase their durability in marine environments.

Figure 2:
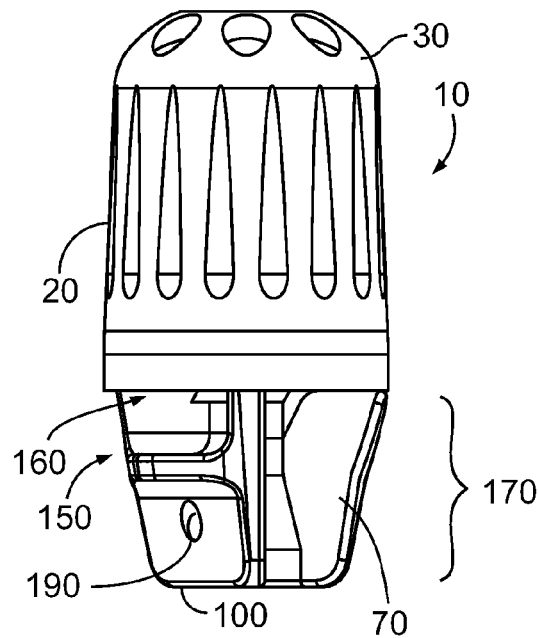
FIG. 2 is a side elevational view of the splicing nut of the first embodiment.
Figure 3:
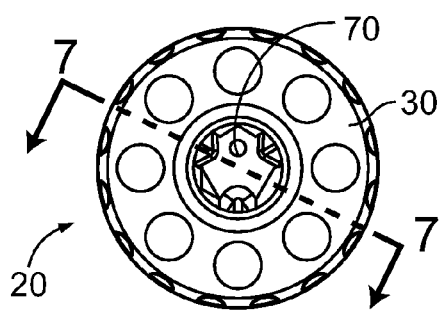
FIG. 3 is a top plan view of the splicing nut of the first embodiment.
Figure 4:
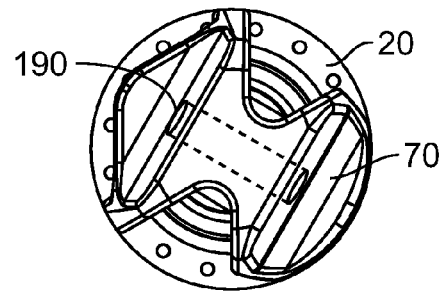
FIG. 4 is a bottom plan view of the splicing nut of the first embodiment.

In a first embodiment of the invention, when the threads 60 of the nut portion 20 are fully mated with the threads 120 of the core 70, at least one of the slots 130 is only partially covered by the nut portion 20 so as to define a visualization port 150 in the core 70 between the core 70 and the nut portion 20. The visualization port provides visual access to at least a portion 160 of at least one of the slots 130 as shown FIGS. 1, 2, and 7. As such, a user may quickly ascertain if a line 140 is completely retained within the nut portion 20 and the core 70.

Figure 8:
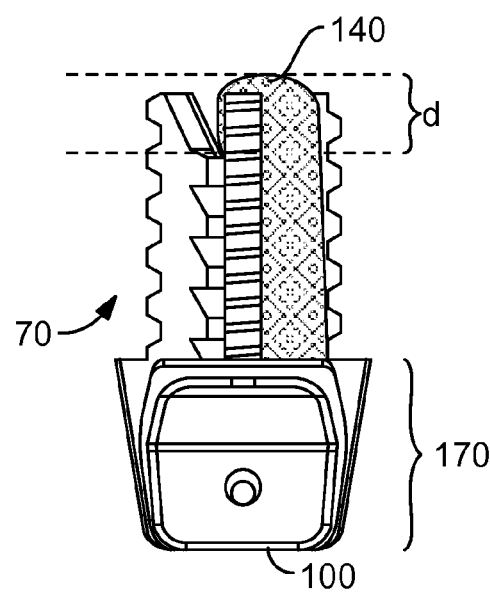
FIG. 8 is a side elevational view of the core of the splicing nut of the first embodiment, rotated 30 degrees from the view shown in FIG. 5, and additionally illustrating a portion of a line retained therein.

Preferably, to prevent slippage of the line 140 (FIG. 8), at least one of the slots 130 extends a distance d downward from the top end 90 of the core 70 partway to the center of the core 70. The distance d is less than the diameter of the line 140 (FIGS. 7 and 8). Therefore, when the core 70 is threaded into the nut portion 20 a part of the line 140 touches, and is compressed between, the inside surface 50 of the nut portion 20 and the slot 130. The line 140 is thereby prevented from moving relative to the core 70 and the nut portion 20, greatly reducing the chance that the line 140 will become disengaged from the splicing nut 10.

Figure 9:
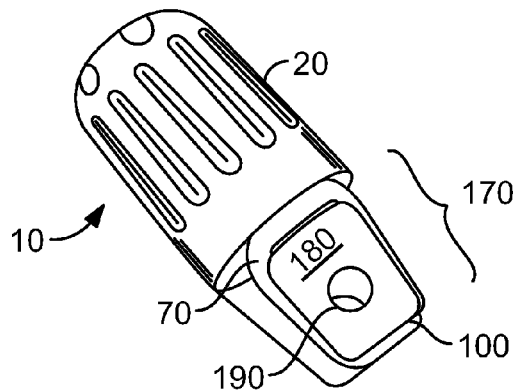
FIG. 9 is a perspective view of a second embodiment of the invention, illustrating a pin hole in a fastening section of the core.

A second embodiment of the invention is illustrated in FIG. 9, which illustrates a fastening portion 170 of the core 70. The fastening portion 170 includes the bottom end 100 of the core 70, and is defined by a portion 180 of the outer surface 110 of the core 70 that is not covered by the nut portion 20 when the threads 60 of the nut portion 20 are fully mated with the threads 120 of the core 70. A pin hole 190 is formed through the fastening portion 170 between the slots 130 of the fastening portion 170.

Figure 10:
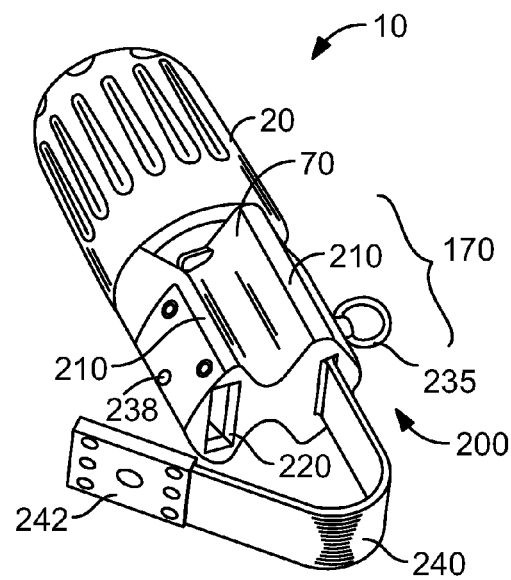
FIG. 10 is a perspective view of an alternate embodiment of the invention, illustrating a shackle strap and shackle strap fastening means formed in the fastening section of the core.
Figure 11:
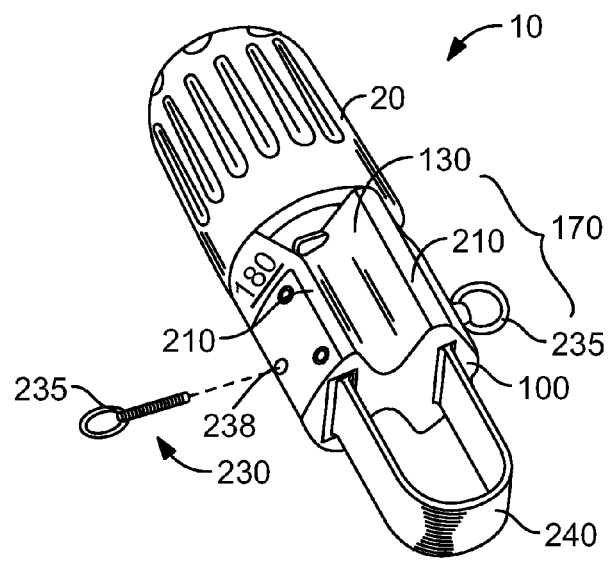
FIG. 11 is a perspective view of the alternate embodiment of the invention shown in FIG. 10, illustrating a shackle strap completely retained in the shackle strap fastening means.

A third embodiment of the invention is illustrated in FIGS. 10 and 11, which illustrate a pair of shackle fastening means 200 each disposed on the fastening portion 170 on opposing sides 210 of the slots 130 of the fastening portion 170. Preferably the shackle fastening means 200 includes a shackle strap cavity 220 open at the bottom end 100 of the core 70 and extending partially through the fastening portion 170 towards the top end 90 of the core 70. A shackle strap locking means 230 for selectively locking one end 242 of a shackle strap 240 therewithin is included. Each end 242 of the shackle strap 240 is adapted to fit into the shackle strap cavity 220 of each shackle fastening means 200 (FIG. 10) and to positively engage the shackle strap locking means 230. Preferably each shackle strap locking means 230 is a transverse bolt 235 threaded through a shackle strap locking hole 238 formed transversely between the outer surface 110 of the fastening portion 170 and the shackle strap cavity 220.

While a particular form of the invention has been illustrated and described, it will be apparent that various modifications can be made without departing from the spirit and scope of the invention. For example, the exact placement of the pin hole 190 may be modified, as may the shape of the fastening portion 170. Accordingly, it is not intended that the invention be limited, except as by the appended claims.

What is claimed is:

1. A splicing nut for use with a line comprising:
   a nut portion, said nut portion having an end, a hole extending inward from said end, said hole defining an inside surface, and female threads disposed on said inside surface of said hole;
   a core adapted to be threaded into said nut portion, said core generally defined by a solid cylindrical body having a top end, a bottom end opposing said top end, an outer surface connecting said top end and said bottom end, and;

a plurality of prongs having an outer surface formed with male threads, said prongs radiating outwardly and upwardly from said core body and forming a plurality of slots between said prongs said prongs forming gaps between said prongs at said top end of said core wherein a line is threaded between said gaps over said top end of said core body and is received by said slots, such that when the core and nut portion are fully mated, the core and the nut portion are adapted to frictionally engage the line around said gaps over said top end of said core, squeezing the line to prevent movement of the line relative to the core and the nut portion.

2. The splicing nut of claim 1 wherein the female threads of said nut portion are fully mated with the threads of said core, at least one of the slots is only partially covered by the nut portion so as to define a visualization port in said core between said core and said nut portion, the visualization port providing visual access to at least a portion of at least one of said slots.

3. A combination comprising the splicing nut of claim 1 and a line wherein:

at least one said slots extends a distance downward from said top end of said core partway to the center of said core, said distance being less than the diameter of said line, such that when said core is threaded into said nut portion a part of said line touches, and is compressed between, the inside surface of said nut portion and said slot.

4. The splicing nut of claim 1 further including a fastening portion incorporating said bottom end of said core, said fastening portion defined by a portion of said outer surface of said core not covered by said nut portion when said threads of said nut portion are fully mated with said threads of said core, each of said slots of said core extending through the fastening portion to said bottom end of said core.

5. The splicing nut of claim 4 wherein the fastening portion further includes a pin hole therethrough formed generally between said slots of said fastening portion.

6. The splicing nut of claim 4 wherein the fastening portion further includes a pair of shackle fastening means each disposed on the fastening portion on opposing sides of said slots of said fastening portion.

7. The splicing nut of claim 6 wherein each said shackle fastening means includes a shackle strap cavity open at the bottom end of said core and extending partially through said fastening portion towards the top end of the core, and a shackle strap locking means for selectively locking one end of a shackle strap therewithin, said one end of the shackle strap adapted to fit into the shackle strap cavity.

8. The splicing nut of claim 7 wherein each said shackle strap locking means is a transverse bolt threaded through a shackle strap locking hole formed transversely between said outside surface of the fastening portion and said shackle strap cavity.

9. A splicing nut comprising:

a nut portion, said nut portion having an end, a hole extending inward from said end, said hole defining an inside surface, and threads disposed on said inside surface of said hole; and a core configured to be capable of being threaded into said nut portion, said core generally defined by a solid cylindrical body having a top end, a bottom end opposing said top end, an outer surface connecting said top end and said bottom end, threads disposed on said outer surface, said threads capable of mating with said threads on said inside surface of said nut portion, and a plurality of prongs having an outer surface formed with male threads, said prongs radiating outwardly and upwardly from said core body and forming a plurality of slots between said prongs, each of said slots being shaped so as to be capable of receiving a line; and a fastening portion of said core incorporating said bottom end of said core, said fastening portion defined by a portion of said outer surface of said core not covered by said nut portion when said threads of said nut portion are fully mated with said threads of said core, each of said slots of said core extending through the fastening portion to said bottom end of said core.

10. The splicing nut of claim 9 wherein the fastening section further includes a visualization port in said core between said core and said nut portion, the visualization port providing visual access to at least a portion of at least one of said slots between said core and said nut portion.

11. A combination comprising the splicing nut of claim 9 and a line wherein:

at least one said slots extends a distance downward from said top end of said core partway to the center of said core, said distance being less than the diameter of said line, such that when said core is threaded into said nut portion a part of said line touches, and is compressed between, the inside surface of said nut portion and said slot.

12. The splicing nut of claim 9 wherein the fastening portion further includes a pin hole formed generally between said slots of said fastening portion.

13. The splicing nut of claim 9 wherein the fastening portion further includes a pair of shackle fastening means each disposed on the fastening portion on opposing sides of said slots of said fastening portion.

14. The splicing nut of claim 13 wherein each said shackle fastening means includes a shackle strap cavity open at the bottom end of said core and extending partially through said fastening portion towards the top end of the core, and a shackle strap locking means for selectively locking one end of a shackle strap, said one of the shackle strap adapted to fit into the shackle strap cavity.

15. The splicing nut of claim 14 wherein each said shackle strap locking means is a transverse bolt threaded through a shackle strap locking hole formed transversely between said outside surface of the fastening portion and said shackle strap cavity.

\* \* \* \* \*